March 18, 1958  M. CLEMENCE  2,827,533
APPARATUS FOR DETECTING ABNORMAL TEMPERATURES
Filed Jan. 15, 1957

United States Patent Office 2,827,533
Patented Mar. 18, 1958

2,827,533

APPARATUS FOR DETECTING ABNORMAL TEMPERATURES

Marcel Clemence, La Chaux de Fonds, Switzerland, assignor to Cachelin & Clemence, La Chaux de Fonds, Switzerland, a firm of Switzerland Application January 15, 1957, Serial No. 634,374

Claims priority, application Switzerland October 13, 1956

3 Claims. (Cl. 200—138)

The present invention has for its object an apparatus for detecting abnormal temperatures of the type wherein a bi-metallic blade closes a control or an alarm circuit when its deformation reaches an amplitude corresponding to a critical value for the temperature prevailing in the surrounding area.

As far as I am aware, none of the known apparatus of this type incorporates any means allowing the operator to adjust himself, either at the moment of the first setting of the apparatus or subsequently, the value or values of the abnormal temperature or temperatures to be detected or to be signalled in accordance with the conditions which are often variable governing the operation of the apparatus.

My improved apparatus has for its object to do away with these limitations and its characteristic feature consists in the fact that the position of the stationary contact piece cooperating with the contact-piece carried by the bi-metallic blade when the temperature reaches its critical value is adjustable through means provided for this purpose.

My said improved apparatus may be designed so as to provide solely for the detection of abnormally high or of abnormally low temperatures or else for detecting both such temperatures: it may in particular, operate both as a fire detector and as a detector of freezing.

In this latter case, it is sufficient to provide two contact-pieces respectively on either side of the blade. At least one of the stationary contact-pieces is then provided, in accordance with my invention, with means for adjusting its position.

I have illustrated by way of example in the accompanying drawing a preferred embodiment of my invention. In said drawing.

Figure 1:
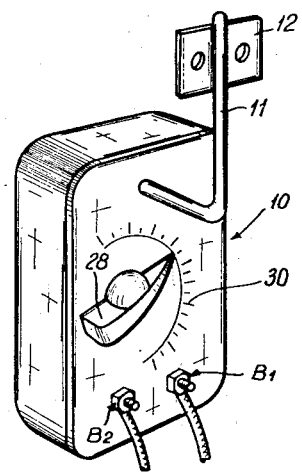
Fig. 1 is a perspective view of the apparatus.
Figure 2:
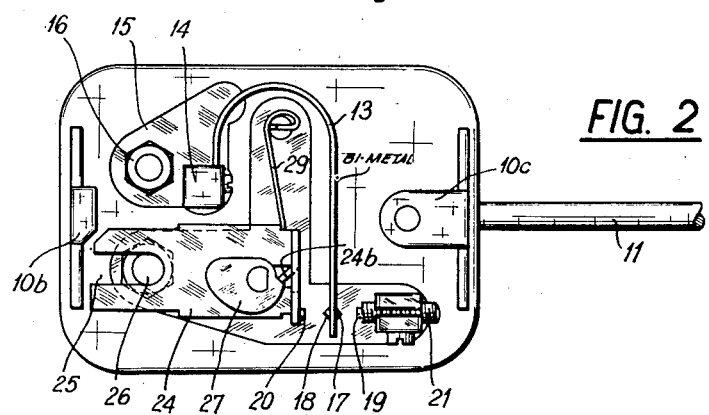
Fig. 2 is a plan view thereof after removal of the cover.
Figure 3:
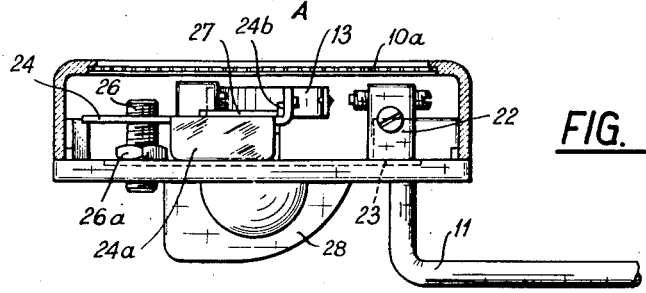
Fig. 3 is an elevational view of the apparatus seen in the direction of the arrow A of Fig. 2, part of the casing being cut off.

The parts forming the apparatus illustrated are enclosed inside an insulating casing 10 closed by a perforated cover 10a which is centered with reference to the body of the casing by the centering members 10b and 10c. Said casing is positioned at the desired location through the rod 11 and the flange 12 thereon.

The bi-metallic blade designated by the reference number 13 is secured through an eye-bolt at one of its ends to the stud 14 rigid with a metal plate 15. The latter is secured to the bottom of the casing by a threaded rod 16 extending through said casing and the outer end of which forms the terminal B1 of the apparatus.

Said bi-metallic blade 13 carries at its free end two gold or silver contact-pieces 17 and 18 adapted to cooperate respectively with the stationary contact-pieces 19 and 20.

The contact-piece 19 is carried by a threaded rod 21 adapted to be shifted axially, through a rotary movement imparted thereto, between the two tapped flanges of a second stud 22 secured in its turn to a second metal plate 23 embedded in the bottom of the casing.

The second stationary contact-piece 20 is carried by the end, which is folded at right angles, of a metal plate 24 provided with a slot 25 through which passes a stationary stud 26; the latter is constituted by a threaded rod secured to the bottom of the casing and to the plate 23 overlying the latter by a fastening nut 26a. The outer end of said threaded rod 26 forms the second terminal B2 of the apparatus.

The plate 24 which rests through two folded flanges 24a on the plate 23 is adapted to slide longitudinally over the stud 26 under the action of the cam 27 keyed to a spindle to which is also keyed the rotary adjusting knob 28 located on the outside of the casing of the apparatus, on the same side as the terminals.

The spindle carrying said knob passes with a fit through the bottom of the casing so that the spring 29 which urges permanently the plate 24 into engagement through the agency of its lug 24b with the cam 27 cannot make the latter turn once the knob has been adjusted angularly in position.

A scale of temperatures 30 is drawn round the knob 28 on the front surface of the apparatus so as to allow the operator to adjust himself the temperature which he considers as abnormal by moving through the knob 28 the contact-piece 20 away from or towards the contact-piece 18.

Obviously, many other embodiments may be resorted to within the scope of the accompanying claims and in particular, it is possible to adjust the position of the two contact-pieces 19 and 20 through two corresponding knobs similar to the knob 28, said knobs acting on two separate cams operating respectively for the abnormally high temperatures and for the abnormally low temperatures to be detected.

It is also possible to consider the possibility of adjusting only one of the abnormal temperatures, the other temperature being defined once and for all; or again, it is possible to adjust the two temperatures solely from the inside of the casing in the manner described for adjusting the position of the contact-piece 19 in the apparatus illustrated.

What I claim is:

1. An instrument for detecting abnormal temperatures, comprising an alarm-circuit including two terminals, a substantially U-shaped bi-metallic blade electrically and mechanically connected with one terminal and deformable under the action of temperature, two normally stationary contact-pieces connected in parallel with the other terminal of the circuit and lying to either side of the free end of the U-shaped bi-metallic blade, contact-pieces carried to either side of the free end of the bi-metallic blade and adapted under the action of variations in temperature to cooperate selectively and alternatingly with the corresponding stationary contact-piece, a plate carrying one stationary contact-piece and adapted to be shifted towards and away from the bi-metallic blade, an angularly shiftable cam controlling the position of said plate to adjustably shift the stationary contact-piece thereon along the path of the corresponding conact-piece on the bi-metallic blade, a knob coaxially rigid with said cam and controlling the angular position thereof and thereby the location of the corresponding normally stationary contact-piece, a hand rigid with said knob and cam system and rotating in unison therewith and a scale of temperatures cooperating with said hand.

2. An instrument for detecting abnormal temperatures, comprising an alarm-circuit including two terminals, a substantially U-shaped bi-metallic blade electrically and mechanically connected with one terminal and deformable under the action of temperature, two normally stationary contact-pieces connected in parallel with the other terminal of the circuit and lying to either side of the free end of the U-shaped bi-metallic blade, contact-pieces carried to either side of the free end of the bi-metallic blade and adapted under the action of variations in temperature to cooperate selectively and alternatingly with the corresponding stationary contact-piece, a plate carrying one stationary contact-piece and adapted to be shifted towards and away from the bi-metallic blade, an angularly shiftable cam controlling the position of said plate to adjustably shift the stationary contact-piece thereon along the path of the corresponding contact-piece on the bi-metallic blade, a knob coaxially rigid with said cam and controlling the angular position thereof and thereby the location of the corresponding normally stationary contact-piece, a hand rigid with said knob and cam system and rotating in unison therewith a scale of temperatures cooperating with said hand, and means controlling the position of the second stationary contact-piece along the path of the cooperating contact-piece on the bi-metallic blade.

3. An instrument for detecting abnormal temperatures, comprising an alarm circuit including two terminals, a bi-metallic blade electrically and mechanically connected with one terminal and deformable under the action of temperature, two normally stationary contact-pieces connected in parallel with the other terminal of the circuit and lying to either side of the free end of the bi-metallic blade, contact-pieces carried to either side of the free end of the bi-metallic blade and adapted under the action of variations in temperature to cooperate selectively and alternatingly with the corresponding stationary contact-piece, a plate carrying one stationary contact-piece and adapted to be shifted towards and away from the bi-metallic blade, an angularly shiftable cam controlling the position of each plate to adjustably shift the stationary contact-piece thereon along the path of the corresponding contact-piece on the bi-metallic blade, a knob coaxially rigid with each cam and controlling the angular position thereof and thereby the location of the corresponding normally stationary contact-piece, a hand rigid with each knob and cam system and rotating in unison therewith, and a scale of temperatures cooperating with each hand.

References Cited in the file of this patent

UNITED STATES PATENTS

| | | |
|---|---|---|
| 483,339 | Beers et al. | Sept. 27, 1892 |
| 545,076 | Hill | Aug. 27, 1895 |
| 586,301 | Wiederhold | July 13, 1897 |
| 1,724,425 | Schaum | Aug. 13, 1929 |
| 2,504,370 | Alger | Apr. 18, 1950 |
| 2,681,965 | Kebbon | June 27, 1954 |
| 2,698,890 | Hughes et al. | Jan. 4, 1955 |